United States Patent [19]

Obersteiner

[11] Patent Number: 4,659,145
[45] Date of Patent: Apr. 21, 1987

[54] ADJUSTABLE VEHICLE SEAT

[76] Inventor: Hans Obersteiner, Burggasse 10, 9020 Klagenfurt (Karnten), Austria

[21] Appl. No.: 679,086

[22] Filed: Dec. 6, 1984

[51] Int. Cl.$^4$ .............................................. A47C 1/02
[52] U.S. Cl. .................................... 297/330; 318/568
[58] Field of Search ................ 318/568, 671, 603; 297/330; 248/419, 429

[56] References Cited

U.S. PATENT DOCUMENTS

| 3,042,170 | 7/1962 | Tschirf et al. | 318/568 X |
| 3,072,231 | 1/1963 | Iding | 248/419 X |
| 4,128,797 | 12/1978 | Murata | 318/568 X |
| 4,264,849 | 4/1981 | Fleischer | 297/330 X |
| 4,267,490 | 5/1981 | Thiene | 297/330 X |

FOREIGN PATENT DOCUMENTS 2754689 6/1979 Fed. Rep. of Germany.

Primary Examiner—James T. McCall
Attorney, Agent, or Firm—Young & Thompson

[57] ABSTRACT

A vehicle seat adjustable by at least one servo element (1) comprises a servo element control unit (2), an adjusting circuit (4) for the presetting of desired positions, and a memory circuit (3) programmable with the desired positions for the selection and restoration of preset desired positions. The adjusting circuit (4) is separated from the memory circuit (3), the memory circuit (3) containing at least one read-write memory ($3_i$), and each of these circuits (3, 4) being individually connected to respectively one input ($E_1$ and $E_2$, respectively) of the servo element control unit (2).

4 Claims, 1 Drawing Figure

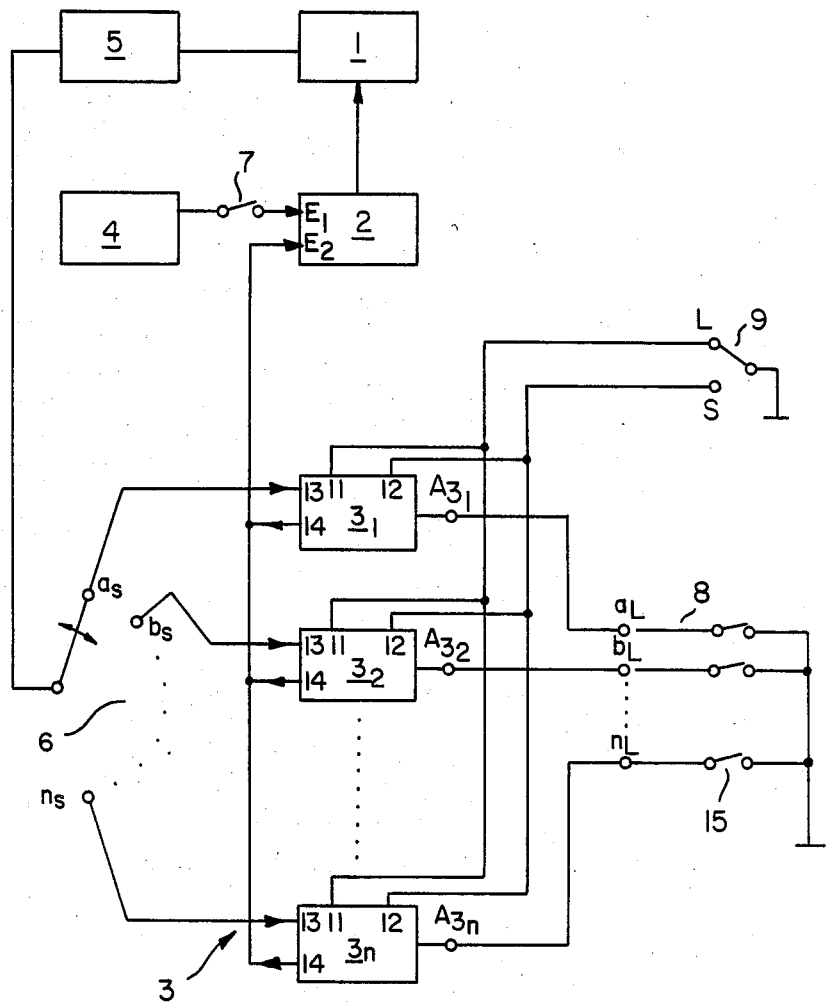

ADJUSTABLE VEHICLE SEAT

The invention relates to a seat, especially for vehicles, wherein the inclination of the seating surface and/or the inclination of the back and/or the position or inclination of the headrest and/or the seat as such, for example with respect to the horizontal, are fashioned to be adjustable and can be placed repeatedly into several preset, desired positions selectable independently of one another, by means of at least one servo element, a servo element control unit, an adjusting circuit for presetting the desired position, and a memory circuit programmable with the desired positions for the selection and restoration of the once preset, desired positions.

Such a seat has been known, for example, from DE-A No. 2,754,689. In this conventional solution, storage potentiometers are provided to which can be fed analog storage data. Presetting of the desired seat position is possible with these storage potentiometers, the input data being stored simultaneously by the position of the storage potentiometers.

The drawback of this conventional solution resides in that the presetting of the desired seat position and the storage of the corresponding data are combined in the storage potentiometers whereby manipulations of the adjusting elements of the control unit are unavoidable. The storage potentiometers must thus have a corresponding design.

It is an object of this invention to avoid this disadvantage and to provide an adjustable seat with a circuit arrangement that can do without special storage potentiometers, with the function of the circuit remaining unimpaired.

This is accomplished according to this invention by providing that the adjusting circuit is separate from the memory circuit, the memory circuit containing at least one read-write memory, and each of these circuits individually being connected to respectively one input of the servo element control unit.

By means of these features, separation of the presetting of the desired seat position and/or of its desired values is achieved from the storage of these values.

According to another feature of the invention, the provision can be made that a desired position can be written, by way of a position sensor and a selector switch, into the and/or into one selectable read-write memory of the memory circuit, and can be repeatedly read out therefrom with the adjusting circuit being deactivated. This provides the result that, in a mutually completely unchanged way, the signal data, once committed to memory and associated with the desired positions of the individual users, can be called up again and again, and consequently the setting of the inclination and/or position of the vehicle seat, or parts thereof, can take place entirely automatically and in an exactly reproducible way.

Furthermore, the provision can be made according to the invention that the adjusting circuit is connected by way of a switch to the corresponding input of the servo element control unit; this switch, in turn, is coupled with a switch regulating the read-write memory or memories of the memory circuit from read to write operation and vice versa. It is thus possible, by a simple switchover of a switch, to commit the adjusting data to memory.

BRIEF DESCRIPTION OF THE DRAWINGS

The accompanying drawing in a circuit diagram of the invention.

The invention will be described below with reference to an example illustrated in the drawing which shows a block circuit diagram of a circuit arrangement of a seat according to this invention.

A servo element 1, for example a servomotor, such as a stepping motor, is connected by way of a mechanical coupling means, not shown herein in detail, in a conventional manner to the back of a vehicle seat or the seat cushion, for example, in such a way that the servo element 1 can execute adjustment of the inclination of the back or of the level setting of the seat. The output of a servo element control unit 2 is connected to the servo element 1; control signals are applied to the inputs $E_1$ and $E_2$ of the servo element control unit, depending on the position of switches 7 and 9. The control characteristic of the servo element control unit 2 is such that each time a new signal is applied to $E_1$ or $E_2$ the servo element 1 is placed into a specific initial position and is only then placed into the position corresponding to the signal applied. Optionally, the servo element control unit 2 also contains an amplifier which amplifies the input signals to an extent adequate for adjusting the servo element. Via the switch 7, an adjusting circuit 4, for example a pulse generator if a stepping motor is used as the servo element 1, is connected to the input $E_1$ of the servo element control unit 2. The read output of a memory circuit 3 containing at least one read-write memory is connected to the input $E_2$. This memory circuit, as will be described in greater detail below, makes it possible to store the signals, once selected by the user, for adjusting the servo element and thus the parts of the vehicle seat in a predetermined position, and to repeatedly transmit these signals in response to a read-out command.

The memory circuit 3 comprises n read-write memories $3_i$ with respective one address input $A_{3i}$, terminals 11 and 12 for conditioning the memory into the read or write condition, a terminal 13 for write-in, and a terminal 14 for reading out data. The terminals 13 are connected to contacts $a_s \ldots n_s$ of a selector switch 6 associated with the write process, and the address inputs $A_{3i}$ are connected to contacts $a_L \ldots n_L$ of a switch 8 associated with the read-out of data.

All terminals 11 of the read-write memories $3_i$ are connected to the contact L, and all terminals 12 thereof are connected to the contact S of switch 9. All of the terminals 14 for reading out data from the read-write memories $3_i$ are connected with the input $E_2$ of the control unit 2.

Furthermore, a position sensor 5 is provided which yields position signals corresponding to the position of the servo element 1 and applies these signals, optionally after conversion into digital signals, to the selector switch 6.

The mode of operation of the circuit arrangement is as follows:

For the first-time, user-adjusted setting of the servo element 1, i.e., for example, an inclination of the back most adapted to a particular user, or a level of the seating surface of a vehicle seat, the user actuates the switch 7 so that signals produced by the adjusting circuit 4 are applied to the input $E_1$ of the servo element control unit 2. On account of the control characteristic, the servo element and accordingly the back or the level adjustment of the seat are adjusted to the initial position and thereupon, in conformance with the signals of the adjusting circuit 4, are adjusted until the user, after reaching the position most adapted to this user, opens the switch 7 again.

The wiper of the switch 9, which latter is rigidly coupled to switch 7, is in position S with switch 7 being closed so that the read-write memories $3_i$ are conditioned for the write position. Prior to operating the switch 7, the user has selected, by adjusting the selector switch 6, a read-write memory, for example $3_i$; as long as the switch 7 is closed, the signals transmitted by the position sensor 5 are continuously fed into this read-write memory.

If the switch 7 is opened, the data stored in the memory circuit 3 correspond accurately to the position of the servo element 1 corresponding to the position and/or inclination of the vehicle seat and/or parts thereof most adapted to the user. In this way, the users can store data of this type in respectively one memory selected by them with the selector switch 6.

If, now, a user finds the vehicle seat and/or parts thereof adjusted, then he can immediately place, for example, the inclination of the back or the seat level into the position most adapted to him by depressing, with switch 9 being in position L, that contact 15 of the switch 8 which is associated with the memory storing the data of the position most adapted to this user, whereby these data are read out and applied to the input $E_2$ of the servo element control unit 2. The latter first resets the servo element 1 into the initial position and thereupon adjusts same, in correspondence with the fed data, into the position corresponding to the position of the vehicle seat most adapted to this user. The contacts 15 are preferably automatically opening contacts, i.e. those which open again after a predetermined time period, or they are merely push buttons per se so that it is ensured with certainty that at a particular time only a single one of these contacts is actuated.

In summation, to operate the memory of the adjustable vehicle seat, the user first adjusts the selector switch so that it contacts one of the contacts $a_S \ldots n_S$. Since each contact $a_S \ldots n_S$ is also connected to the write-in terminal of the memory circuits 3, the one and only one memory circuit which is associated with the selected contact is selected to record the position of the seat. Switch 7 is then closed and the seat is adjusted to a position selected by the user. Simultaneous with the closing of switch 7, switch 9 is switched to position S to enable the memory circuit to store the information which is written in. Thus when the final position of the seat is reached, this position is stored via the selected contact into the memory circuit. Since the address inputs $A_{31}$ of each memory circuit are also connected to one and only one of the contacts $a_L \ldots n_L$, each of these contacts is then associated with a certain position of the seat. Therefore, for example, when $a_S$ is selected to write in the position to memory circuit $3_1$, this position can be read out of $3_1$ by the activation of the contact $a_L$ so that when $a_L$ is pushed at a later time, the seat is automatically adjusted to the selected position.

The above description covers the function of the circuit arrangement according to this invention in connection with the adjustment of the back of a vehicle seat. However, the invention is not limited thereto; rather, it is also possible in this way to adjust the inclination or height of the seating surface, the position and inclination of the headrest, or the total position of the vehicle seat over-all.

Moreover, another embodiment of the invention can also reside in that one and the same servo element is utilized for the adjustment of several components of the vehicle seat, thus, for example, the inclination of the seat as well as the inclination of the back and/or of the headrest. The coupling device in this case is constructed to be selective for the component, and the servo element control unit 2 suitably consists of a central computer unit.

If the seat is associated, as usual in automotive vehicles, with rearview mirrors (outside mirror and/or inside mirror) and these are adjustable or settable by means of a motor, then it is within the scope of this invention to include the rearview mirror as well in the circuit arrangement.

The invention is not restricted to automotive vehicle seats but can also be utilized, for example, in other types of conveyances, such as airplanes.

The circuit arrangement of this invention can include its own current source (accumulator) in order to ensure that the desired positions stored in the read memory remain in the memory even if the vehicle current supply fails.

I claim:

1. Apparatus for controlling the position of a vehicle seat, comprising at least one servo element (1), a servo element control unit (2), an adjusting circuit (4) for presetting the desired positions, and a memory circuit (3) programmable with the desired positions for selection and restoration of the once preset desired positions, characterized in that the adjusting circuit (4) is separate from the memory circuit (3), the memory circuit (3) containing at least one read-write memory ($3_i$), and each of these circuits (3, 4) being connected individually to respectively one input ($E_1$ and $E_2$, respectively) of the servo element control unit (2).

2. Apparatus according to claim 1, characterized in that a desired position can be written, by way of a position sensor (5) and a selector switch (6), into read-write memory ($3_i$) or into a selectable read-write memory ($3_i$) of the memory circuit (3), and can be read out therefrom repeatedly with the adjusting circuit (4) being deactivated.

3. Apparatus according to claim 1, characterized in that the adjusting circuit (4) is connected by way of a switch (7) to the corresponding input ($E_1$) of the servo element control unit (2), this switch (7) being coupled, in turn, with a switch (9) that switches the read-write memory or read-write memories ($3_i$) of the memory circuit (3) from read to write operation and vice versa.

4. Apparatus according to claim 2, characterized in that the memory circuit (3) contains a plurality of read-write memories ($3_1 \ldots 3_n$), and a further selector switch (8) operable by a user of the apparatus to read out from a selected said read-write memory ($3_1 \ldots 3_n$).

* * * * *